(12) United States Patent
Sowerby et al.

(10) Patent No.: US 6,817,251 B1
(45) Date of Patent: Nov. 16, 2004

(54) METHOD OF REDUCING PARTICLE BUILD-UP ON A SURFACE LOCATED WITHIN A RECESS OF A CONDUIT CARRYING PARTICULATE MATERIAL

(75) Inventors: Brian David Sowerby, Kareela (AU); Stephen Rainey, Eschol Park (AU); Michael James Millen, Panania (AU); Philip Thomas Rafter, Brightwaters (AU)

(73) Assignee: Commonwealth Science and Industrial Research Organisation, Campbell Act (AU)

( * ) Notice: Subject to any disclaimer, the term of this patent is extended or adjusted under 35 U.S.C. 154(b) by 12 days.

(21) Appl. No.: 10/048,774

(22) PCT Filed: Aug. 11, 2000

(86) PCT No.: PCT/AU00/00958

§ 371 (c)(1),
(2), (4) Date: Oct. 9, 2002

(87) PCT Pub. No.: WO01/12998

PCT Pub. Date: Feb. 22, 2001

(30) Foreign Application Priority Data

Aug. 11, 1999 (AU) .............................................. PQ2155

(51) Int. Cl.[7] .................................................. G01F 1/20
(52) U.S. Cl. .................................................. 73/861.39
(58) Field of Search ........................ 73/861.39, 861.41, 73/861, 861.23, 861.18; 137/240, 103.2; 134/104.1, 198

(56) References Cited

U.S. PATENT DOCUMENTS

| 4,882,934 A | 11/1989 | Leffert et al. |
| 4,982,610 A | 1/1991 | Gordon et al. |
| 5,864,067 A | * 1/1999 | Ligneul et al. .......... 73/861.21 |

FOREIGN PATENT DOCUMENTS

| DE | 198 00 573 A1 | 7/1999 |
| GB | 1406951 A | 9/1975 |
| JP | 11166720 A | 6/1999 |
| WO | 91/09284 A | 6/1991 |

* cited by examiner

Primary Examiner—Edward Lefkowitz
Assistant Examiner—Corey D. Mack
(74) Attorney, Agent, or Firm—Merchant & Gould P.C.

(57) ABSTRACT

Method and housing (2) for reducing particulate build-up on a surface of a device (5) contained in a recess (4) defined by the housing (2) when attached to a conduit. The method includes introducing gas into the recess (4) at a high volume and low velocity so that the gas flows in a laminar manner across the surface of the device (5). The volume lies in a range from 80 to 300 liters/minute and the velocity lies in a range from 0.2 to 3.6 meters/second. The method and housing (2) are particularly useful for preventing the build up of coal dust on the face of an ultrasonic transducer (5) used to measure the mass flow rate of coal being pneumatically transferred in the conduit.

16 Claims, 1 Drawing Sheet

METHOD OF REDUCING PARTICLE BUILD-UP ON A SURFACE LOCATED WITHIN A RECESS OF A CONDUIT CARRYING PARTICULATE MATERIAL

BACKGROUND OF THE INVENTION

1. Field of the Invention

The present invention relates to a method of reducing particle build-up on a surface recessed from a conduit carrying particles of a solid entrained in a gas.

2. Related Art

Solid materials in particulate form are conveyed pneumatically in a range of industries. Cement raw materials and finished product can be conveyed pneumatically. Similarly, coal is commonly conveyed pneumatically to burners in power station boilers. In the coal fired boilers of the type used to generate electricity, coal is pulverised in grinding mills and transported by heated primary air pipes to individual burners contained within a plurality of similar burners that comprise the burner of a boiler. Maldistribution of fuel across the burner fuel supply pipes has detrimental effects on boiler performance. Fuel rich areas lead to high levels of unburnt carbon in fly ash and fuel lean areas can lead to high levels of $NO_x$. In order to improve the efficiency of boiler performance, it is necessary to monitor the mass flow rate of coal within the burner supply pipes.

International Patent Application Publication No. WO 91/09284 and U.S. Pat. No. 4,882,934 describe meters that are capable of measuring the mass flow rate of particulate material conveyed pneumatically in a conduit. Both devices utilise changes induced in ultrasonic beams transmitted across a conduit carrying particulate material to determine the velocity of flow and concentration of solids and hence mass flow rate of solids in the conduit.

The ultrasonic transducers shown in FIG. 6 and the figure accompanying the abstract of the specification of U.S. Pat. No. 4,882,934 are mounted flush with the wall of the conduit in which they are located, and in operation partially intrude into the conduit. It was envisaged that the flow of particulate material in the conduit itself would maintain the face of the transducers free of particulate build-up.

Tests on arrangements similar to the device described in U.S. Pat. No. 4,882,934 indicated that ultrasonic transducers exposed to the flow of particulate material in a conduit will suffer from several problems. These are as follows:

(i) a variable level of solids adheres to the transducers thereby varying the sound leaving the transmitting transducer and the sound entering the receiving transducer;

(ii) the impact of solids travelling at typically 25 meters per second wears the transducer and degrades its performance; and (iii) the elevated temperature in the conduit will reduce the signal transmitted by up to 50% and variation in temperature will cause changes in sound entering or leaving the transducer. In addition, the lifetime of the transducers will be reduced at elevated temperatures.

Furthermore, transducers of the type disclosed in the specification of U.S. Pat. No. 4,882,934 can only be replaced if the conduit is taken out of service. Since coal conveying conduits are usually higher in pressure than atmospheric, removal of a transducer from an in-service conduit carrying coal would lead to substantial leakage of particulate coal from the conduit.

The specification of International Patent Application Publication No. WO 91/09284 discloses in FIG. 1, transducers located within recesses. Locating the transducers within recesses reduces transducer wear, but does not prevent the build-up of particulate material. Attempts to prevent the build-up of particulate material on the transducer surface with jets of air succeeded in preventing build-up, but degraded the ultrasonic signal produced by the transducer as a result of turbulence created in the recess.

SUMMARY OF THE INVENTION

The present inventors have now discovered that particulate build-up on the face of an ultrasonic transducer located in a recess can be prevented by introducing gas into the recess at relatively high volume, but low velocity. Furthermore, the volume of gas required is very low with respect to the volume of gas flowing through the conduit.

Accordingly, the present invention provides a method of reducing particulate build-up on a surface recessed from a conduit carrying particles of a solid entrained in a gas, the method including blowing gas into a recess containing the surface at high volume and low velocity so that gas entering the recess flows in a substantially laminar manner.

The present invention also provides a housing for attachment to a conduit, the housing defining a recess when attached to the conduit in which a device such as an ultrasonic transducer can be mounted and including first inlet means for introducing gas into the recess in such a way that the gas flows at high volume and low velocity in a laminar manner across a face of the device located in the recess.

The housing may also include second inlet means for introducing gas at high pressure and high velocity into the recess.

Gas introduced into the recess via the first inlet permits the face of the device located in the recess to remain free of particulate build-up. It also can be used to cool the device. The high pressure inlet permits devices to be changed whilst the conduit is in service. Thus, in a preferred form, the invention allows compressed gas to be delivered in two different ways:

(i) as a high velocity stream directed into the recess; and (ii) a high volume, low velocity stream directed onto the face of the device.

The high velocity jet directed into the recess enables interchange of a device while the conduit is in service. The second gas stream enables cooling of the device and maintains the face of the device free of particulate matter.

The way in which air is delivered to the face of the device may be critical to its performance. Taking an ultrasonic transducer as an example, delivering a high velocity jet of air onto the face of the transducer cleans the face but reduces the efficiency of the ultrasonic beam transmitted or received by the transducer as a result of turbulence. The present invention permits the face of the ultrasonic transducer to remain free of particulate matter whilst minimising the disturbance of the ultrasonic transmission.

In order to ensure laminar flow of gas across the face of the transducer and through the recess, gas is preferably introduced into the recess via a calming chamber that reduces the velocity of the incoming gas to that at which laminar flow prevails.

DETAILED DESCRIPTION OF THE INVENTION

Figure 1:
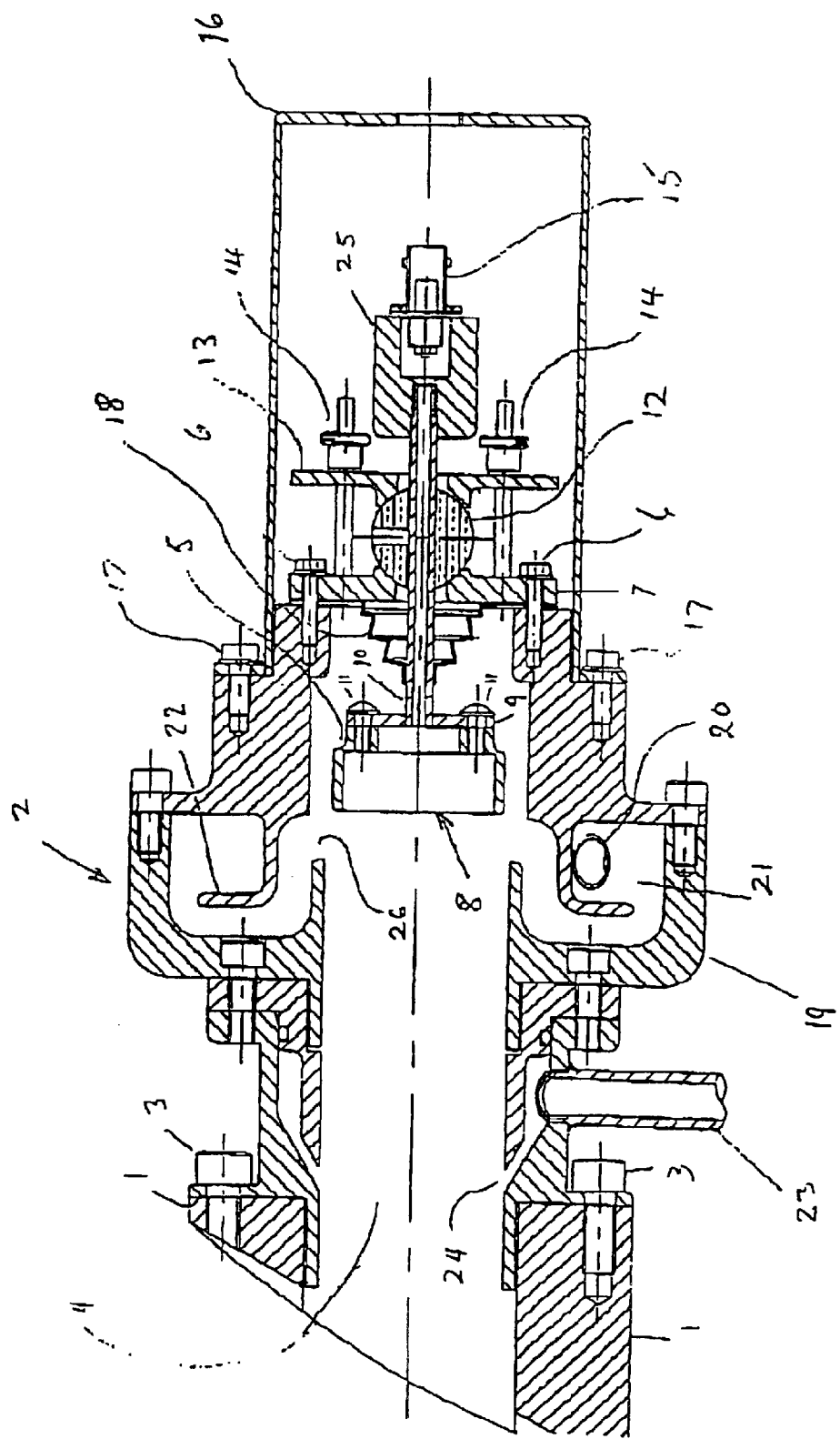
FIG. 1 is a cross-sectional view of an example conduit and mounted transducer according to principles of the present invention.

An embodiment of the present invention will now be described with reference to FIG. 1, which is a cross-sectional view of a transducer mounted within a recess according to the invention.

FIG. 1 depicts an annular mounting pad 1 located on the wall of a conduit (not shown). The mounting pad 1 is welded onto the conduit over a hole which has been previously cut or drilled in the conduit. A housing 2 is secured to the mounting pad 1 by means of bolts 3. The housing 2 defines a recess 4. An ultrasonic transducer 5 is mounted within the recess 4 by means of bolts 6 that secure a base plate 7 to the housing 2. The ultrasonic transducer 5 comprises a ceramic element 8 having a polyurethane cover and a transducer capsule 9 secured to a swivel rod 10 by means of bolts 11. The swivel rod 10 passes through a swivel ball 12 mounted between base plate 7 and ball swivel mounting plate 13. Ball swivel mounting plate 13 is connected to base plate 7 by means of adjustable screws 14.

Swivel rod 10 passes through a bore in base plate 7, ball swivel 12 and ball swivel mounting plate 13 and terminates in an adjusting handle 12. The handle 25 incorporates a standard BNC connector 15. Two thin wires run from the ceramic element 8 to the BNC connector 15. An electronic signal fed to the connector 15 activates the ultrasonic transducer. A cover 16 is secured to the housing 2 by means of bolts 17. A flexible dust shield 18 is attached to the base plate 7 and engages the circumference of the swivel rod 10. Flexible dust shield 18 is preferably made from a suitable elastomer such as butyl rubber.

The housing 2 includes an annular calming chamber 21 which surrounds the circumference of recess 4. Air inlets 20 are located within chamber 21 defined by chamber wall 19 and flange 22. Flange 22 located within chamber 21 prevents direct entry of air into recess 4 and distributes the air around annular chamber 21. Air bleeds out of the annular chamber 21 into recess 4 via a circumferential entry port 26. The volume of the chamber 21 is approximately 1.5 times the volume of recess 4. Preferably there are three inlets 20 located equidistantly around the circumference of the annular calming chamber 21.

The housing 2 includes a single high pressure line 23 having an inlet 24 directed outwardly from the recess away from the face of the transducer.

As air leaves inlets 20, it slows thereby ensuring that the flow of air into the recess 4 is largely laminar. On the other hand, air blown through pipe 23 into the recess through inlet 24 is highly turbulent and forms a curtain at the mouth of the recess. This enables the dust-free removal and replacement of transducer 5 whilst the conduit to which annular mounting plate 1 is attached is still in use.

Adjustable screws 14 may be used to swivel transducer 5 through an arc of 5° about the ball swivel 12. The flexible dust shield 18 restricts access of abrasive particulate material to the ball swivel 12 thereby ensuring longer service.

In use air may flow out of chamber 21 at a rate in a range from 80 to 300 liters/minute, which corresponds to an air flow velocity out of recess 4 of 0.2 to 3.6 meters/second. Typically in a coal burner conduit which has a pressure 5% above atmospheric pressure, a flow of 150 liters/minute will maintain the transducer free of particle build-up. As can be seen from FIG. 1, air flowing out of chamber 21 is directed across the face of the transducer from all directions around the circumference of the transducer face. Upon introduction to the recess 4, the air begins to change direction towards the outlet from recess 4 and ultimately leaves recess 4 travelling in a direction that is substantially parallel to the longitudinal axis of recess 4.

What is claimed is:

1. A method of reducing particle build-up on a surface recessed from a straight conduit carrying particles of a solid entrained in a carrier gas, the method including blowing a separate gas onto the recessed surface at high volume and low velocity so that the separate gas flows in a substantially laminar manner.

2. A method according to claim 1, wherein the separate gas is blown onto the recessed surface via a calming chamber that has the effect of reducing the velocity of the separate gas to that at which laminar flow prevails.

3. A method according to claim 1, wherein the separate gas is blown onto the recessed surface at a volume in a range from 80 to 300 liters per minute at a velocity in a range from 0.2 to 3.6 meters/second.

4. A method according to claim 1, wherein the recessed surface forms part of an ultrasonic transmitter that is capable of transmitting ultrasonic beams through the recess and across the conduit.

5. A housing for attachment to a conduit which carries particles of a solid entrained in a carrier gas, the housing defining a recess when attached to a conduit in which a device can be mounted, the housing including first inlet means for introducing a separate gas into the recess in such a way that the separate gas flows at high volume and low velocity in a laminar manner across a face of the device when mounted in the recess.

6. A housing according to claim 5, wherein the device is an ultrasonic transducer.

7. A housing according to claim 6, wherein the ultrasonic transducer is used to measure the mass flow rate of particulate coal in the conduit.

8. A housing according to claim 5, wherein the housing includes a second inlet means for introducing a jet of gas at high pressure and high velocity into the recess to enable interchange of the device while the conduit is in service.

9. A housing according to claim 8, wherein the jet of gas is a jet of air.

10. A housing according to claim 5, wherein the housing includes a calming chamber for reducing the velocity of incoming gas to that at which laminar flow prevails.

11. A housing according to claim 5, wherein the separate gas is air.

12. A method according to claim 5, wherein the device is an ultrasonic transducer.

13. A housing for attachment to a conduit, the housing defining a recess when attached to a conduit in which a device can be mounted, the housing including first inlet means for introducing a gas into the recess in such a way that the gas flows at high volume and low velocity in a laminar manner across a face of the device when mounted in the recess, and includes a second inlet means for introducing a jet of gas at high pressure and high velocity into the recess to enable interchange of the device while the conduit is in service.

14. A housing according to claim 13, wherein the recess forms part of an ultrasonic transmitter that is capable of transmitting ultrasonic beams through the recess and across the conduit.

15. A method of reducing particle build-up on a surface recessed from a straight conduit carrying particles of a solid entrained in a carrier gas, the method including blowing a separate gas across the recessed surface at high volume and low velocity so that the separate gas flows in a substantially laminar manner.

16. A method according to claim 15, wherein the recessed surface forms part of an ultrasonic transmitter that is capable of transmitting ultrasonic beams through the recess and across the conduit.

* * * * *